Dec. 20, 1938.  A. T. GINMAN  2,140,525
METHOD OF INSCRIBING PHOTOSENSITIVE ELEMENTS
Filed Sept. 10, 1937
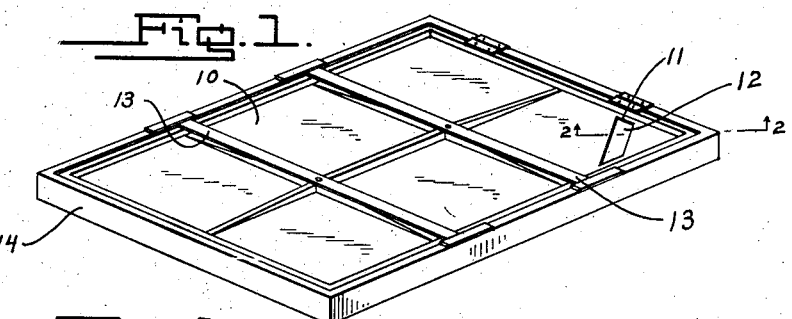
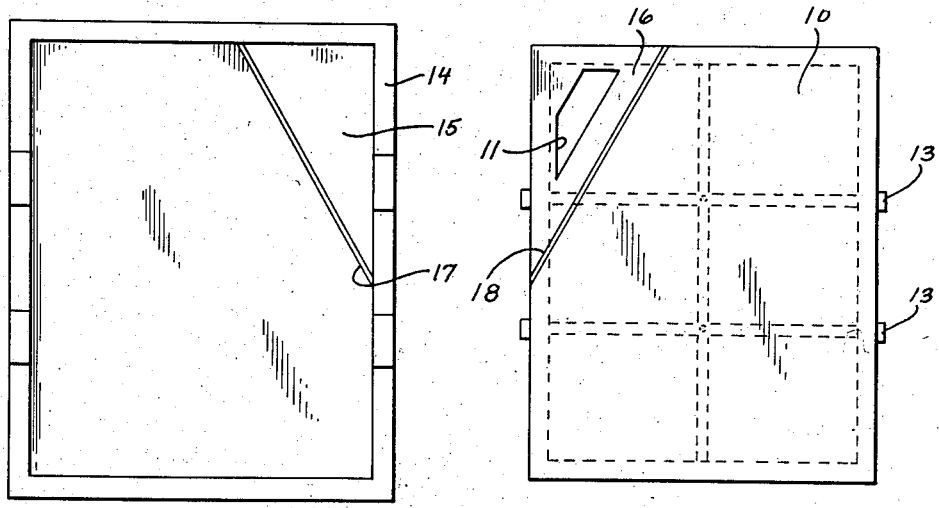
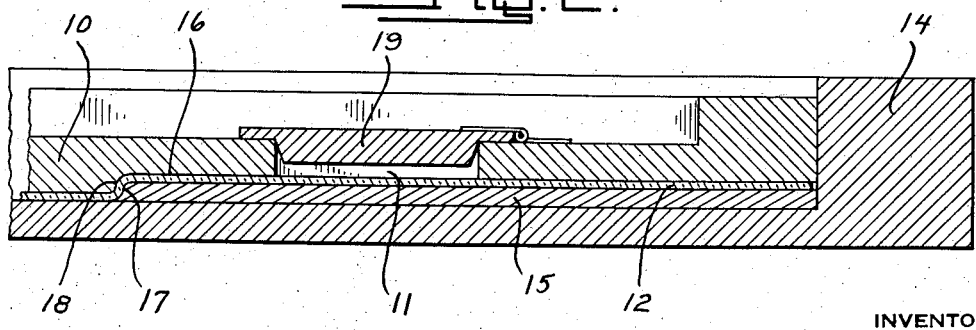
INVENTOR.
Alvar T. Ginman
BY *Lynn B. Morris*
ATTORNEY Patented Dec. 20, 1938

2,140,525

UNITED STATES PATENT OFFICE 2,140,525

METHOD OF INSCRIBING PHOTOSENSITIVE ELEMENTS

Alvar T. Ginman, Parlin, N. J., assignor to Du Pont Film Manufacturing Corporation, New York, N. Y., a corporation of Delaware Application September 10, 1937, Serial No. 163,322

6 Claims. (Cl. 250—67)

This invention relates to photography and particularly to a novel method for autographing or recording inscriptions directly on photo-sensitive elements.

A principal object of this invention is to provide a novel method for autographing photosensitive elements so that the inscriptions are applied directly to the sensitized surface. A further object is to provide such a method that will permit inscriptions to be visible on the element before exposure, and throughout subsequent processing as well as on the finished picture. Another object is to provide such a method that is suitable for marking X-ray film particularly when exposed in the novel cassette described and claimed in co-pending application Serial No. 159,946, filed August 19, 1937, by O. E. Conklin. Another object is to provide a novel method for the positive autographing and identification of radiographs before and after exposure. Additional and more specific objects will plainly appear from the detailed specification and claims herein presented as a preferred embodiment of the present invention given in exemplification and not in limitation thereof.

The value of the present invention is of major importance when used in radiography where X-ray pictures must be positively identified with the patient both while the picture is being taken and after it is finished. It is preferred to employ the present invention in conjunction with the Conklin cassette previously referred to herein, wherein the loaded cassette or film holder together with an intensifying screen, if used, is provided with a light-locked aperture that presents an uncovered portion of the film to the operator, outside of the covered or picture receiving portion of the film.

The nature of this invention will be more fully understood from the following description and the accompanying drawing of a suitable cassette which may be used in carrying it out, of which Fig. 1 is a perspective view of the cassette enclosing a film ready to be marked;

Fig. 2 is a vertical cross-section taken on the line 2—2 in Fig. 1;

Fig. 3 is a plan view of the top member or door of the cassette; and

Fig. 4 is a plan view of the body of the cassette showing the recessed bottom member thereof.

In Fig. 1 the cover of the cassette is shown at 10 embodying the opening 11 provided with a hinged cover 19 through which inscriptions may be applied to the film 12 showing therethrough. The cover member 10 is provided with pressure clamps 13 for providing pressure contact with the recessed body member 14.

The body member 14 is provided with a raised corner element 15 made of material preferably impervious to X-ray as shown in Fig. 4. The top member is provided with an opening 11 as shown in Fig. 3 and its under side is provided with a recess at 16 as shown in Fig. 2 adapted to interfit with the member 15 shown in Fig. 4. The edge of the member 15 is bevelled preferably at an angle of approximately 60° as shown at 17 in Figure 2 and a like bevel is applied to the recess portions of the cover 10 as shown at 18 in Fig. 2. These bevels are so formed that they will grip the film 12 as a result of the pressure applied by the pressure clamps 13 and form thereby a light lock at 17 and 18 as shown in Fig. 2.

In operation the technician places the X-ray film in the cassette in the usual manner and clamps it therein by means of the clamps 13. This will force the marginal or corner portion of the film into the position shown at 17 and 18 in Fig. 2, thus forming an effective light-lock which prevents the passage of light into the image and major area of the film. The film may be readily marked with any desired identifying indicia through the opening 11, first removing the cover in a manner which will be more fully described below.

No precaution need be taken to hurry the inscription of the film after it has been loaded in the apertured cassette. The resulting fogging action on the uncovered portion of the film has been found to have no material effect on the subsequent inscription providing it does not exceed a matter of hours in normal room illumination. However, it is preferred for the sake of final clarity of the inscriptions to limit this casual exposure to room illumination to a period of approximately 15 minutes, although even this limitation is not necessary to get successful results.

The aforementioned uncovered portion of the film may then be inscribed or autographed by the operator with writing material, preferably with an ordinary graphite lead pencil, directly upon the uncovered sensitized surface of the film or element either before or after the picture is taken on the covered portion of said film or element. After the thus inscribed picture is taken it may be developed, processed and finished in the usual way.

On the finished picture the herein described inscriptions will appear on the film by transmitted light as clear white lines immediately surrounded by an area of medium density metallic silver within the outline of the image of the aperture. Outside and around the outline of the image of the aperture will appear a border area of developed silver of excessive density. By reflected light the herein described inscription on the finished picture will appear distinctly lighter in color than the surrounding area and are also readily legible thereon.

Research relating to the present invention has shown that the fogging exposure of the uncovered portion of the film during and after the writing or inscription thereon, may vary from a fraction of a minute to a number of hours. Thus it has been found that with 50 foot-candles of illumination on the film on the area on which the indicia are placed, the fogging action of this illumination is sufficient to render readily legible indicia with fogging time ranging from 20 seconds to 5 hours. As approximately 30 seconds is required to inscribe a patient's name and address or other information on a film, it is thus apparent that the fogging exposure may readily be limited to this period of time. In case the overall room illumination on the film at the time of inscription is not of the order of 50 foot-candles the fogging time or solarization exposure of the uncovered portion of the film should be raised accordingly. Thus with only 10 foot-candles of room illumination on the film the fogging or solarization exposure would be approximately 150 seconds.

It will thus be seen that the present invention utilizes a fogging illumination exposure on the aperture uncovered indicia bearing portion of the film or element, of sufficient strength to solarize the photographic emulsion to a point where, after development, the reduced silver within the aperture image and adjacent to the indicia lines is materially greater in density than the reduced silver in the indicia lines themselves, but substantially less than the density of the reduced silver outside of and bordering the outline of the aperture image.

For example, tests have shown that in using X-ray film in the Conklin cassette with a fogging illumination of 50 foot-candles the silver density bordering the aperture image is approximately 4.0; the solarized area within the aperture image and surrounding the indicia having the density of 2.3 and the indicia densities ranging from .045 to .155, after an exposure of 30 seconds.

As the hereindescribed indicia are made visible by differences in transmission of the herein exemplified densities of the various aforementioned silver areas the following table further illustrates the relationship between the densities and their transmission of light:

| Area | Density | Percent of transmission |
|---|---|---|
| | | Percent |
| Outside border | 4.0 | 0.01 |
| Solarized area within aperture | 2.3 | 5 |
| Indicia lines | .045 to .155 | 70 to 90 |

To accelerate the fogging time of the aperture-uncovered portion of the film or element during or after writing the indicia thereon the operator may be provided with illumination from any well known over-voltaged incandescent lamps known commercially as photo-flood bulbs or the fogging exposure may be made by mercury vapor lamps or direct sunlight. The inscriptions are preferably applied with ordinary writing material such as graphite pencil or crayon pencils containing a writing material wherein lubricated friction and moderated writing pressure between the point of the writing material used and the marking surface transfers a portion of the writing material to the writing surface.

While the foregoing specification sets forth preferred exemplifications and embodiments of the present invention it is intended to include all variations and modifications within the spirit and scope of the appended claims.

I claim:

1. The method of recording inscriptions on a partially uncoverable photosensitized element before said element is developed into a finished picture that includes the steps of writing on an uncovered portion of said element; subjecting said uncovered portion to a solarizing exposure, taking a picture on the covered portion of said element and subsequently developing and finishing said element.

2. The method of recording inscriptions on a portionally uncoverable X-ray film before said film is developed into a finished radiograph that includes the steps of writing an inscription directly on an uncovered portion of an emulsion side of said film; exposing a radiograph on said film; subjecting said inscription bearing uncovered portion of said film to a solarizing exposure and subsequently developing and finishing said film.

3. The method of recording inscriptions on a portionally uncovered photosensitized element before said element is developed into a finished picture that includes the steps of writing directly on an uncovered portion of an emulsion side of said element subjecting said uncovered portion to a solarizing exposure, taking a picture on the covered portion of said element and subsequently developing and finishing said element.

4. The method of recording inscriptions on a portionally uncoverable X-ray film before said film is developed into a finished radiograph that includes the steps of writing an inscription directly on an uncovered portion of an emulsion side of said film; exposing a radiograph on said film; subjecting said inscription bearing uncovered portion of said film to a solarizing exposure and subsequently developing and finishing said film.

5. In a method of recording inscriptions upon a photosensitized element and obtaining a finished photograph, the steps which comprise inscribing indicia upon an uncovered portion of the element and solarizing said uncovered and inscribed portion.

6. In a method of recording inscriptions upon a sensitized X-ray film element and obtaining a finished radiograph, the steps which comprise inscribing indicia directly upon an uncovered emulsion side of said element and subjecting said element to a solarizing exposure.

ALVAR T. GINMAN.